(12) United States Patent
Zhang et al.

(10) Patent No.: US 11,373,305 B2
(45) Date of Patent: Jun. 28, 2022

(54) IMAGE PROCESSING METHOD AND DEVICE, COMPUTER APPARATUS, AND STORAGE MEDIUM

(71) Applicant: Tencent Technology (Shenzhen) Company Limited, Shenzhen (CN)

(72) Inventors: Ruixin Zhang, Shenzhen (CN); Xinyang Jiang, Shenzhen (CN); Xing Sun, Shenzhen (CN); Xiaowei Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 16/989,474

(22) Filed: Aug. 10, 2020

(65) Prior Publication Data

US 2020/0372648 A1    Nov. 26, 2020

Related U.S. Application Data

(63) Continuation of application No. PCT/CN2019/082718, filed on Apr. 15, 2019.

(30) Foreign Application Priority Data

May 17, 2018   (CN) .......................... 201810474974.1

(51) Int. Cl.
*G06T 7/00* (2017.01)
*G06T 7/174* (2017.01)
(Continued)

(52) U.S. Cl.
CPC ......... *G06T 7/0012* (2013.01); *G06N 3/0454* (2013.01); *G06N 3/08* (2013.01);
(Continued)

(58) Field of Classification Search
None
See application file for complete search history.

(56) References Cited

U.S. PATENT DOCUMENTS 8,577,115 B2 * 11/2013 Gering .................... G06T 7/143
                                                                 382/132
9,739,783 B1 *  8/2017 Kumar ............. G01N 33/57492
(Continued)

FOREIGN PATENT DOCUMENTS

CN        107527351 A      12/2017
CN        107748900 A       3/2018
(Continued)

OTHER PUBLICATIONS

Ayoub Benali Amjoud et al., "Convolutional Neural Networks Backbones for Object Detection", Jul. 8, 2020, International Conference on Image and Signal Processing (ICISP 2020) pp. 282-289, XP047553935, ISSN: 0302-9743.
(Continued)

*Primary Examiner* — Martin Mushambo
(74) *Attorney, Agent, or Firm* — Morgan, Lewis & Bockius LLP (57) ABSTRACT

An image processing method is provided, including: obtaining a target image; invoking an image recognition model including: a backbone network, a pooling module and a dilated convolution module that are connected to the backbone network and that are parallel to each other, and a fusion module connected to the pooling module and the dilated convolution module; performing feature extraction on the target image by extracting, using the backbone network, a feature map of the target image, separately processing, using the pooling module and the dilated convolution module, the feature map, to obtain a first result outputted by the pooling module and a second result outputted by the dilated convolution module, and fusing the first result and the second
(Continued)

result by using the fusion module into a model recognition result of the target image; and determining a semantic segmentation labeled image of the target image based on the model recognition result.

17 Claims, 8 Drawing Sheets

(51) Int. Cl.
  *G06N 3/04* (2006.01)
  *G06N 3/08* (2006.01)
  *G06T 1/20* (2006.01)
(52) U.S. Cl.
  CPC ............... *G06T 1/20* (2013.01); *G06T 7/174* (2017.01); *G06T 2207/20081* (2013.01); *G06T 2207/20084* (2013.01); *G06T 2207/30092* (2013.01); *G06T 2207/30096* (2013.01)

(56) References Cited

U.S. PATENT DOCUMENTS

| | | | |
|---|---|---|---|
| 9,865,042 B2* | 1/2018 | Dai | G06T 5/10 |
| 9,953,236 B1 | 4/2018 | Huang et al. | |
| 9,978,003 B2* | 5/2018 | Sachs | G06V 40/161 |
| 10,521,911 B2* | 12/2019 | Odry | G06T 7/0016 |
| 10,867,190 B1* | 12/2020 | Vajna | G06V 20/64 |
| 2017/0132514 A1* | 5/2017 | Krizhevsky | G06V 30/194 |
| 2018/0032865 A1* | 2/2018 | Nishimura | G06N 3/08 |
| 2018/0285656 A1* | 10/2018 | Yano | G06V 40/20 |
| 2019/0065884 A1* | 2/2019 | Li | G06K 9/627 |
| 2019/0122360 A1* | 4/2019 | Zhang | G06K 9/6267 |
| 2019/0180142 A1* | 6/2019 | Lim | G06N 3/0454 |
| 2019/0236411 A1* | 8/2019 | Zhu | G06V 10/82 |
| 2019/0252073 A1* | 8/2019 | Hsu | G06T 7/0012 |
| 2019/0355128 A1* | 11/2019 | Grauman | G06T 7/194 |
| 2020/0175313 A1* | 6/2020 | Jang | G06N 3/0481 |
| 2021/0089807 A1* | 3/2021 | Liu | G06N 3/084 |

FOREIGN PATENT DOCUMENTS

| | | | |
|---|---|---|---|
| CN | 107767384 A | | 3/2018 |
| CN | 107808389 A | | 3/2018 |
| CN | 108021923 A | * | 5/2018 |
| CN | 108021923 A | | 5/2018 |
| CN | 108734211 A | | 11/2018 |

OTHER PUBLICATIONS

Extended European Search Report, EP19803474.6, dated Sep. 27, 2021, 12 pgs.
Tencent Technology, ISR, PCT/CN2019/082718, Jul. 12, 2019, 2 pgs.
Tencent Technology, WO, PCT/CN2019/082718, Jul. 12, 2019, 5 pgs.
Tencent Technology, IPRP, PCT/CN2019/082718, Nov. 17, 2020, 6 pgs.

* cited by examiner

Gastric pathological image    Semantic segmentation labeled image

(1) A dilation rate is 6    (2) A dilation rate is 12    (3) A dilation rate is 18

IMAGE PROCESSING METHOD AND DEVICE, COMPUTER APPARATUS, AND STORAGE MEDIUM

CROSS-REFERENCE TO RELATED APPLICATIONS

This application is a continuation application of PCT Patent Application No. PCT/CN2019/082718, entitled "IMAGE RECOGNITION METHOD, STORAGE MEDIUM AND COMPUTER DEVICE" filed on Apr. 15, 2019, which claims priority to Chinese Patent Application No. 201810474974.1, entitled "IMAGE PROCESSING METHOD AND APPARATUS" filed May 17, 2018, all of which are incorporated by reference in their entirety.

FIELD OF THE TECHNOLOGY

The present disclosure relates to the field of image recognition, and in particular, to an image processing method and apparatus, a computer device and a storage medium.

BACKGROUND OF THE DISCLOSURE

The convolutional neural network, as a feedforward neural network that contains convolution calculation and has a deep structure, is one of representative algorithms of deep learning. The convolutional neural network may be widely applied to the field of image processing. In the medical field, an image recognition model may be constructed based on the convolutional neural network, to recognize an abnormal tissue region, for example, a cancer tissue region in a gastric pathological image.

Generally, convolutional neural networks used for recognizing pathological images mainly have three types of structures: (1) a fully convolutional network; (2) a convolutional neural network based on dilated convolution; and (3) a convolutional neural network based on spatial pooling. A computer device may recognize an abnormal tissue region in a pathological image by using the image recognition model.

However, during recognition of the abnormal tissue region, a conventional image recognition processing manner cannot balance accuracy with segmentation precision. Using a gastric pathological image as an example, cancer tissue regions in the gastric pathological image have different sizes, a size range is relatively wide, and the texture is disordered and irregular. When a method based on the fully convolutional network is applied to large-size and small-size cancer tissue areas, recognition accuracy is relatively low. A method based on dilated convolution at a single dilation rate has a relatively good segmentation effect only on cancer tissue regions in a certain size range, and cannot meet a size range of actual cancer tissue regions. A method based on spatial pooling may recognize large-size and small-size cancer tissue areas, but results in great loss of pathological image information causes loss of the segmentation accuracy. The foregoing conventional methods for recognizing a gastric pathological image based on the convolutional neural network structure has a certain limitation. Therefore, an image processing method is urgently needed, to meet both the accuracy and segmentation precision requirements.

SUMMARY

Embodiments of this application provide an image processing method and apparatus, a computer device, and a storage medium.

An information processing method is provided, executed by a computer device, the method including:

obtaining a target image;

invoking an image recognition model, the image recognition model including: a backbone network, a pooling module and a dilated convolution module that are connected to the backbone network and that are parallel to each other, and a fusion module connected to the pooling module and the dilated convolution module;

performing feature extraction on the target image by extracting, using the backbone network, a feature map of the target image, separately processing, using the pooling module and the dilated convolution module, a feature map outputted by the backbone network, to obtain a first result outputted by the pooling module and a second result outputted by the dilated convolution module, and fusing the first result and the second result by using the fusion module, to output a model recognition result of the target image; and determining a semantic segmentation labeled image of the target image based on the model recognition result.

A computer device is provided. The computer device includes a processor and a memory, the memory storing a plurality of computer-readable instructions, the computer-readable instructions, when executed by the processor, causing the processor to perform the aforementioned information processing method.

A non-transitory computer-readable storage medium is provided, storing a plurality of computer-readable instructions, the computer-readable instructions, when executed by one or more processors, causing the one or more processors to perform the aforementioned information processing method.

Details of one or more embodiments of this application are provided in the following accompany drawings and descriptions. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings.

An embodiment of this application provides an image processing method, and the method may be implemented by a server.

Figure 1:
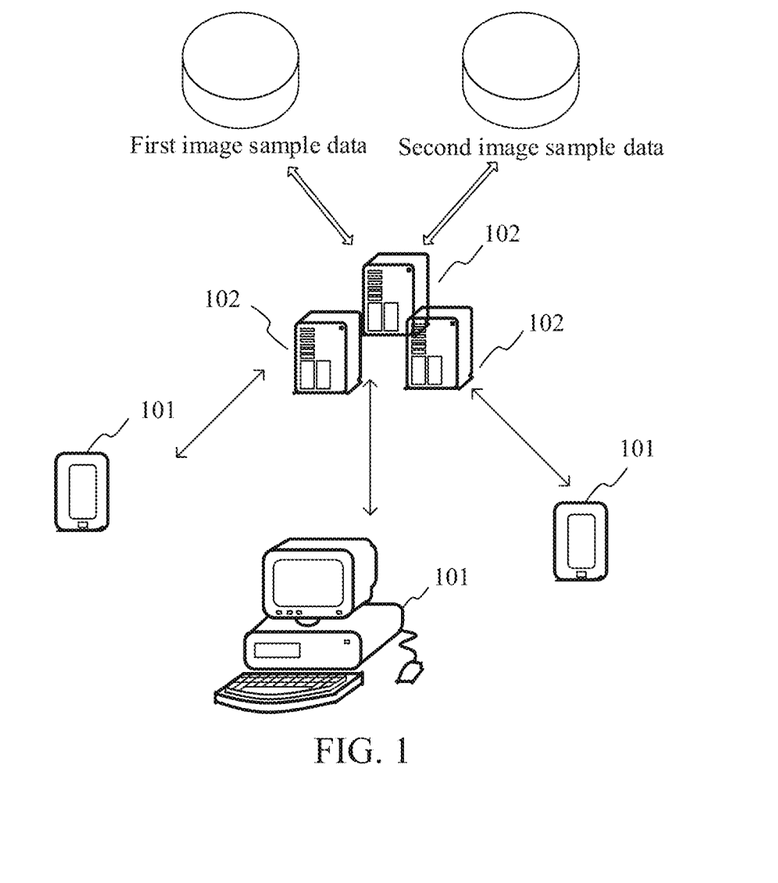
FIG. 1 is a diagram of an implementation environment according to an embodiment of this application.

FIG. 1 is a diagram of an implementation environment according to an embodiment of this application. The implementation environment may include a plurality of terminals 101, and a server 102 configured to serve the plurality of terminals. The plurality of terminals 101 are connected to the server 102 through a wireless or wired network. The plurality of terminals 101 may be an electronic device that can access the server 102. The electronic device may be a computer, a smartphone, a tablet computer, or another electronic device. The server 102 may be one or more computing servers. The server 102 may be used as an entity performing calculation. The server 102 may determine a semantic segmentation labeled image of a target image according to a user's request for processing the target image by using the terminal 101. For the server 102, the server 102 may further include at least one database, which is used for storing a first image sample, a second image sample, and the like used in a training process. In this embodiment of this application, the terminal 101 may be used as a requester to request, by accessing the server 102, the server 102 to process the target image. Certainly, the image processing method provided in this embodiment of this application may be further implemented by other computer devices having a processing capability.

The target image in this embodiment of this application may be a pathological image. An objective of image recognition is to recognize a target material in the pathological image. For example, the target material may be an abnormal tissue such as a cancer tissue, a tumor infiltrating lymphocyte (TIL) or an antigen KI67 (a nuclear protein that is related to and may be necessary for cell proliferation, generally used for determining the malignancy degree of a tumor), or the like.

The following describes terms in the embodiments of this application.

Pathological section: a pathological section is manufactured from a pathological tissue of a certain size by using a pathological histology method. A manufacture method is generally embedding the pathological tissue in a paraffin block, cutting the pathological tissue into slices by using a slicing machine, and then staining with hematoxylin-eosin (H-E), to obtain the pathological section.

Figure 2:
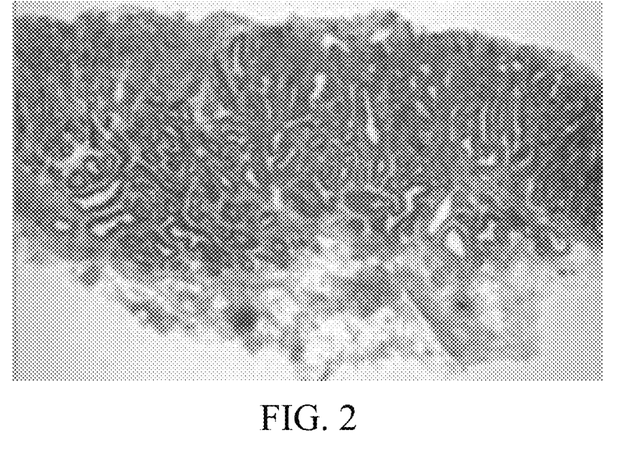
FIG. 2 is a schematic diagram of a low-magnification pathological image according to an embodiment of this application.
Figure 3:
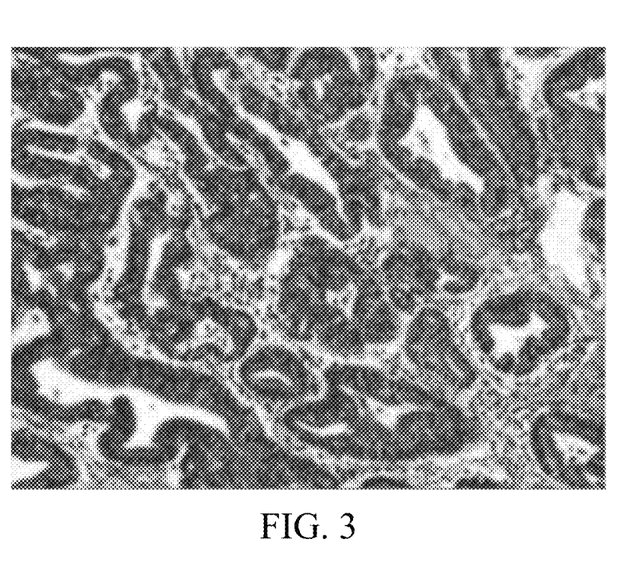
FIG. 3 is a schematic diagram of a high-magnification pathological image according to an embodiment of this application.

A pathological image is an electronic image obtained by shooting or scanning the pathological section. Pathological images may be classified into low-magnification pathological images and high-magnification pathological images according to different magnifications during shooting. A low-magnification pathological image is shown in FIG. 2. An image of a whole pathological section is shown in the figure, and a local texture is blurred. A high-magnification pathological image is shown in FIG. 3. A local image of a pathological section is shown in the figure, where the texture is clear, and cells may be distinguished. The pathological image used in this embodiment of this application is a high-magnification pathological image, such as a high-magnification pathological image magnified 20 times.

The image recognition model in the method may be a convolutional neural network model. Before the image is processed by using the method, the image recognition model needs to be trained. The following describes a training process with reference to the flowchart of the training method of the image recognition model shown in FIG. 4.

Figure 4:
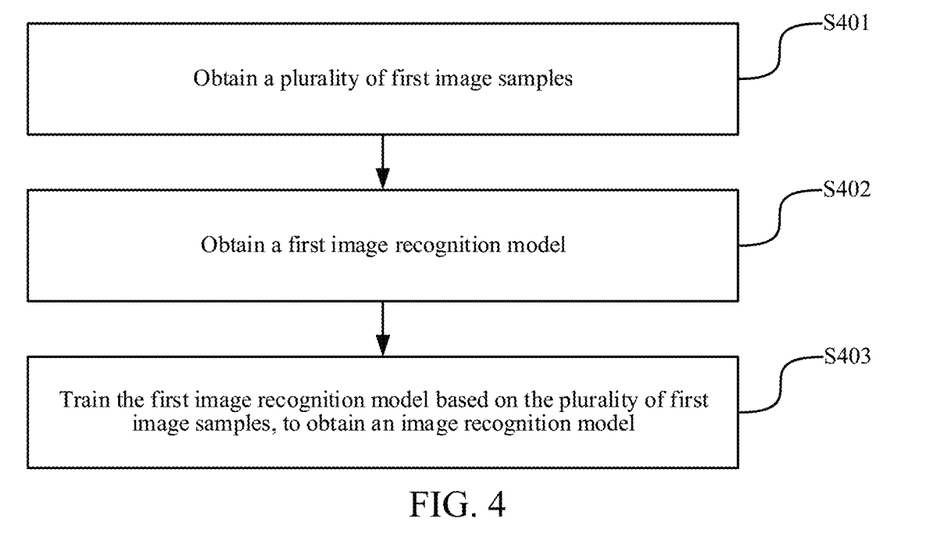
FIG. 4 is a flowchart of a training method of an image recognition model according to an embodiment of this application.

S401. Obtain a plurality of first image samples.

The first image samples may include images belonging to the same type as the target image and corresponding semantic segmentation labeled images. A gastric pathological image is used as an example in this embodiment of this application. If the image processing method is used for processing a gastric pathological image, the images in the first image samples are also gastric pathological images (that is, images of the same type).

Figure 5:
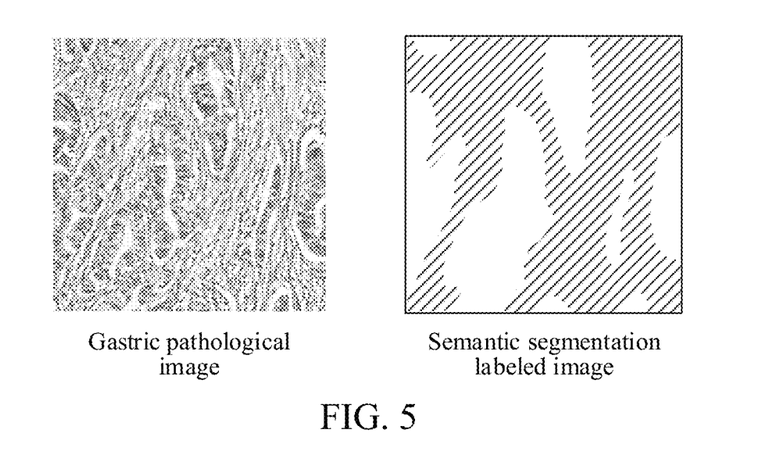
FIG. 5 is a schematic diagram of a gastric pathological image and a semantic segmentation labeled image according to an embodiment of this application.

In a possible implementation, a doctor may manually label a plurality of gastric pathological images in advance, to obtain a semantic segmentation labeled image corresponding to each gastric pathological image. A schematic diagram of a gastric pathological image and a semantic segmentation labeled image is shown in FIG. 5. The semantic segmentation labeled image may be a black and white binary image. A cancer tissue region (for example, a white region of the semantic segmentation labeled image in FIG. 5) is white, and a non-cancer tissue region (for example, a shadow region of the semantic segmentation labeled image in FIG. 5) is black.

The foregoing plurality of gastric pathological images and the corresponding semantic segmentation labeled images may be used as the first image samples, and stored in a database of the server. When the server trains the image recognition model, the first image samples may be obtained from the foregoing database.

S402. Obtain a first image recognition model.

The first image recognition model may include: a pre-trained backbone network, an initial pooling module and an initial dilated convolution module that are connected to the pre-trained backbone network and that are parallel to each other, and an initial fusion module connected to the initial pooling module and the initial dilated convolution module. A weight of each convolution kernel in the convolutional neural network is referred to as a network weight, and training the convolutional neural network is adjusting the network weights.

In an embodiment, the backbone network may be a convolutional neural network from which a classification module has been removed. The classification module may include a pooling layer and/or a fully connected network.

Figure 6:
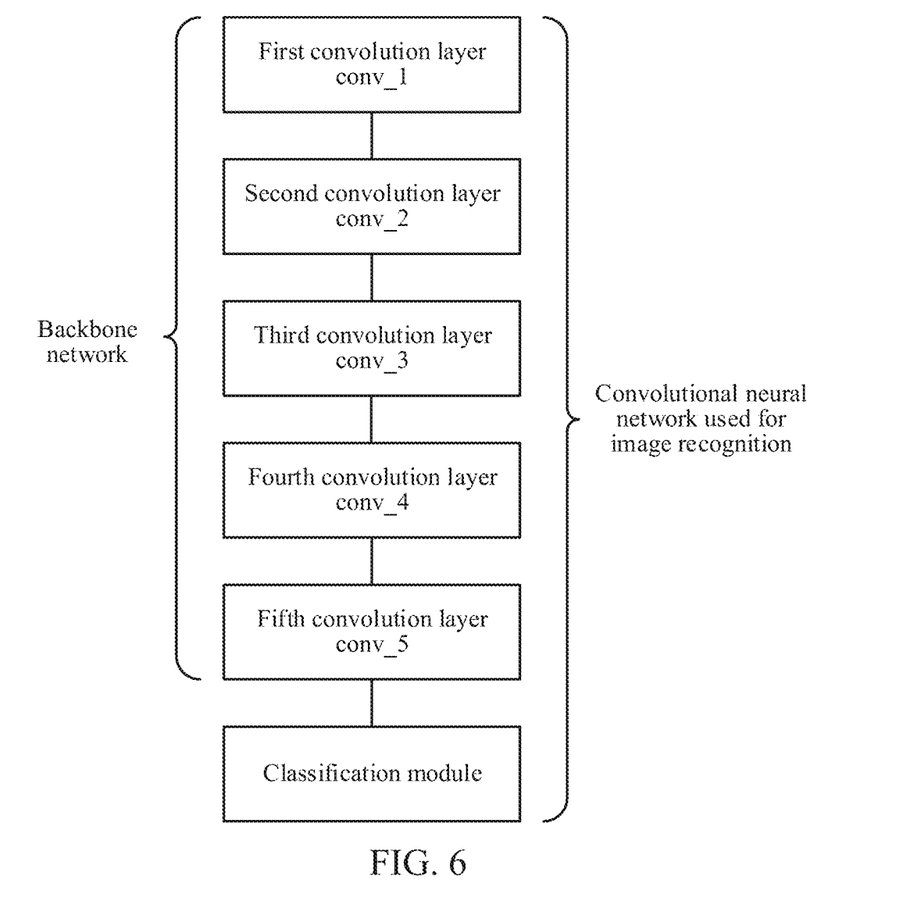
FIG. 6 is a schematic structural diagram of a convolutional neural network according to an embodiment of this application.

That is, the backbone network may be a convolutional neural network that reserves layers until the last convolution layer. An output of the backbone network may be a feature map of the image. For example, the backbone network may be a ResNet101 (a deep convolutional neural network). FIG. 6 is a schematic structural diagram of a convolutional neural network. The backbone network only includes layers till the last convolution layer (that is, a fifth convolution layer). However, a general convolutional neural network used for image recognition further includes the classification module. The backbone network may alternatively be another convolutional neural network, for example, Inclusion-Resnet-V2, NasNet, MobileNet, or the like. This is not limited herein.

To ensure a certain accuracy of the image recognition model obtained through training, the training needs to be performed based on a relatively large quantity of gastric pathological images. However, in an actual situation, with limited energy, a doctor only labels few gastric pathological images, which may fail to meet a data volume required for training. Therefore, the backbone network may be pre-trained, so that the backbone network has certain sensitivity to features (such as a color, a texture, and the like) of the image, thereby improving the accuracy of extracting the feature map. In this way, when the image recognition model is trained based on the gastric pathological images, the data volume and a training time required for training may be reduced.

Figure 7:
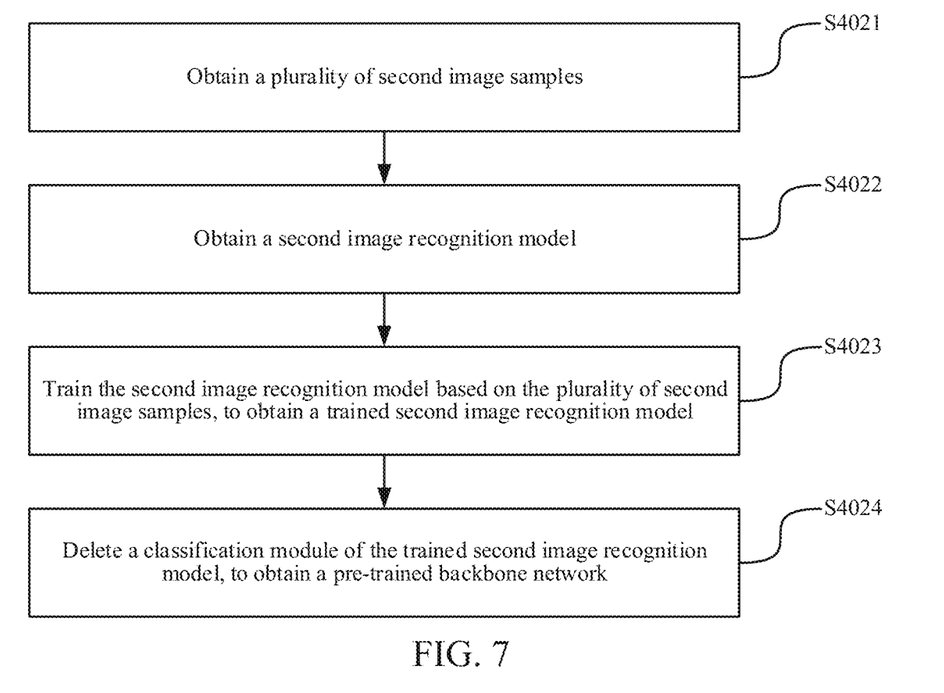
FIG. 7 is a flowchart of a pre-training method of a backbone network according to an embodiment of this application.

Optionally, FIG. 7 is a flowchart of a pre-training method of the backbone network. The pre-training method of the backbone network may include the following steps:

S4021. Obtain a plurality of second image samples.

The second image samples may include a plurality of types of images and corresponding classification results.

In an embodiment, the images in the second image samples may be a plurality of common types of images, such as a character image, a vehicle image, an animal image, and the like. Such images are easy to obtain and have a large data volume.

The foregoing second image samples may be stored in the database of the server. When the server pre-trains the backbone network, the second image samples may be obtained. For example, the server may obtain the foregoing various types of images from the Internet, and label classification results based on keywords of the images. The classification results are stored in the database.

S4022. Obtain a second image recognition model.

The second image recognition model may include an initial backbone network and an initial classification module. A network structure of the second image recognition model may be shown as the convolutional neural network used for image recognition in FIG. 6.

S4023. Train the second image recognition model based on the plurality of second image samples, to obtain a trained second image recognition model.

In an embodiment, the server may input the foregoing second image samples to the second image recognition model, classify each image, and adjust network weights of the second image recognition model based on the classification results outputted by the model and the classification results labeled in the second image samples.

S4024. Delete a classification module of the trained second image recognition model, to obtain a pre-trained backbone network.

In an embodiment, after the training is finished, the server may delete the classification module from the second image recognition model, and only reserve layers in the second image recognition model until the last convolution layer.

Alternatively, the server may obtain network weights of the trained backbone network, so that when the foregoing first image recognition model is established, initial network weights of the backbone network are set to the obtained network weights.

Figure 8:
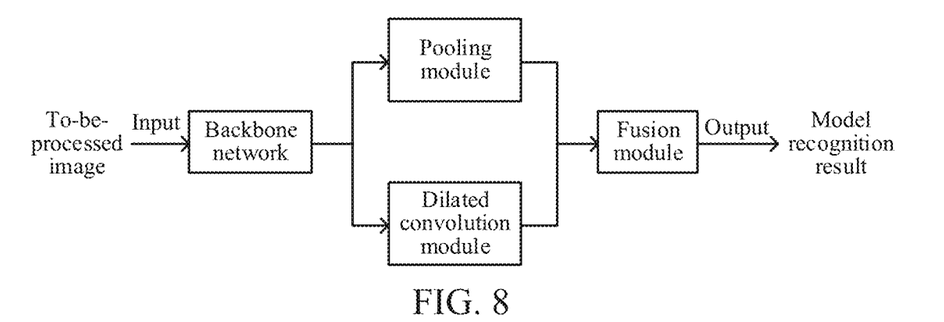
FIG. 8 is a schematic structural diagram of a first image recognition model according to an embodiment of this application.

The initial pooling module and the initial dilated convolution module may be spliced in parallel behind the pre-trained backbone network, to obtain the first image recognition model. Initial network weights of the initial pooling module and the initial dilated convolution module may be set by a skilled person according to a requirement. This is not limited herein.

A structure of the first image recognition model is shown in FIG. 8. The feature map outputted by the backbone network is used as an input of the pooling module and an input the dilated convolution module respectively, to obtain a first result corresponding to the pooling module and a second result corresponding to the dilated convolution module respectively. Finally, the first result and the second result are fused by using the fusion module, to output a model recognition result. Optionally, fusion processing may be as follows: performing weighted average calculation on the first result and the second result by using the fusion module based on a first weight corresponding to the pooling module and a second weight corresponding to the dilated convolution module, to output the model recognition result.

Figure 9:
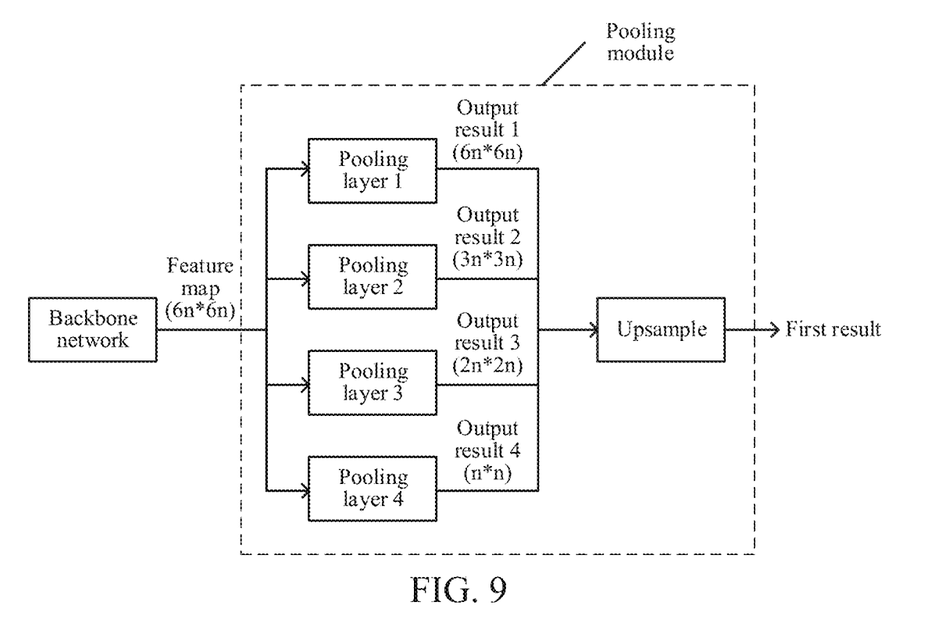
FIG. 9 is a schematic diagram of a pooling module according to an embodiment of this application.

Optionally, the pooling module may be a spatial pyramided pooling net (SPP-Net). The schematic diagram of the pooling module shown in FIG. 9 may include four pooling layers of which side lengths of output results are 1/1, 1/2, 1/3 and 1/6 of input side lengths, the output results of the four pooling layers are upsampled, and finally the first result corresponding to the pooling module is outputted. The pooling module may alternatively be established based on other pooling methods, which are not limited herein. Based on the processing of the pooling module, multi-size information in the image may be obtained. That is, cancer tissue regions of different sizes may be recognized.

Figure 10:
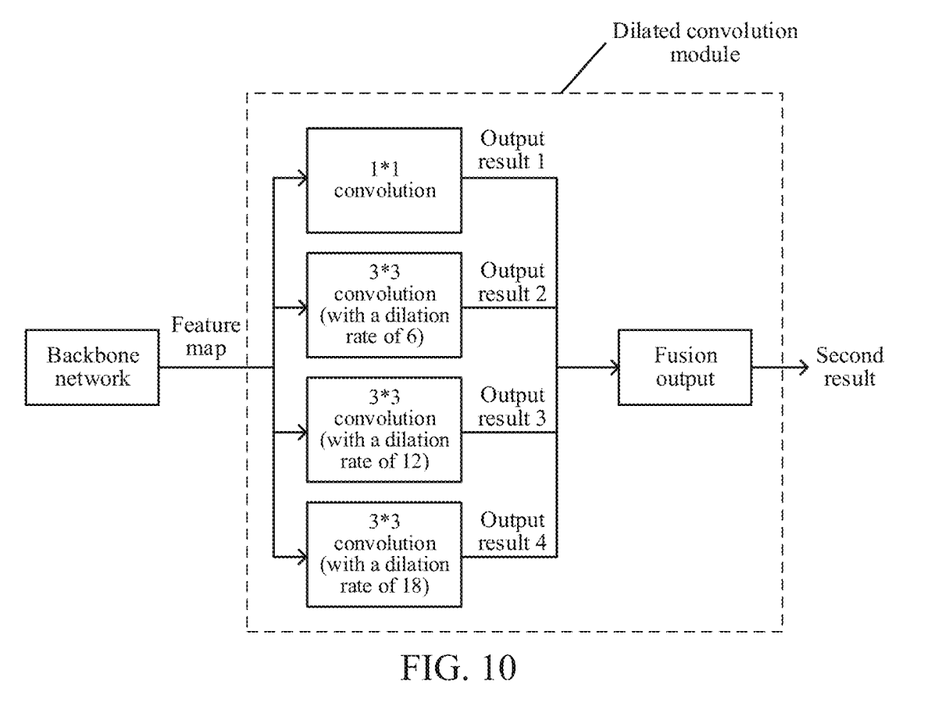
FIG. 10 is a schematic diagram of a dilated convolution module according to an embodiment of this application.
Figure 11:
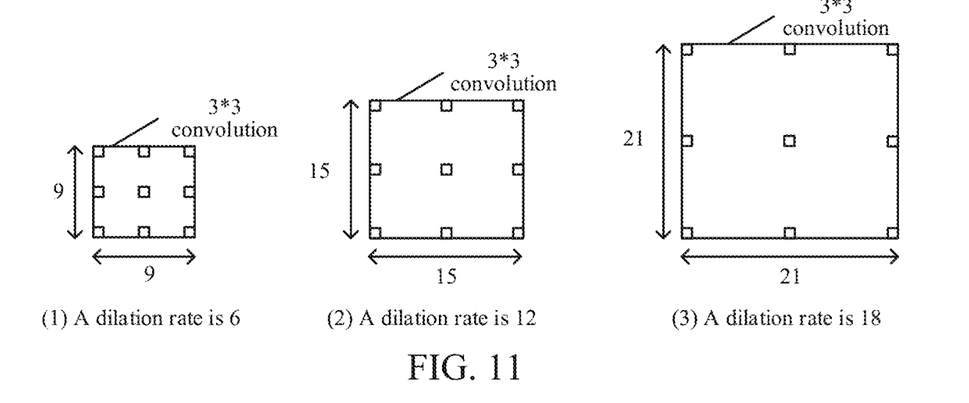
FIG. 11 is a schematic diagram of dilated convolution with different dilation rates according to an embodiment of this application.

Optionally, the dilated convolution module may include more than one dilated convolution branch with different dilation rates. FIG. 10 is a schematic diagram of a dilated convolution module. The dilated convolution module may be formed by four branches including 1*1 convolution, 3*3 convolution with a dilation rate of 6, 3*3 convolution with a dilation rate of 12, and 3*3 convolution with a dilation rate of 18, where the dilated convolution module includes three dilated convolution branches, and a result of each branch may be fused, to output the second result corresponding to the dilated convolution module. A fusion process may use a fusion manner similar to that of the foregoing fusion process of the first result and the second result, for example, a weighted average calculation manner. This is not limited herein. The dilated convolutions with different dilation rates are shown in FIG. 11. Based on the processing of the dilated convolution module, different dilation rates have different receptive fields. Cancer tissue regions of different size ranges may be recognized, and information of image details is not lost, so that the precision of semantic segmentation may be ensured.

The foregoing pooling module or the dilated convolution module may further be replaced by another module meeting an image semantic segmentation requirement, or a new parallel module may be added on the basis of the pooling module and the dilated convolution module. For example, the pooling module or the dilated convolution module may be replaced with a U-Net (a convolution network that may be used for segmenting a cell image), or the U-Net, the pooling module, and the dilated convolution module may be connected in parallel behind the backbone network, provided that both the precision and the accuracy of the semantic segmentation are ensured. This is not limited in this embodiment of this application.

S403. Train the first image recognition model based on the plurality of first image samples, to obtain an image recognition model.

In an embodiment, the server may input the first image samples to the first image recognition model, and classify pixels in each image, to output an obtained model recognition result. The model recognition result may be specifically a pixel classification matrix having the same pixel size as an input image, and the semantic segmentation labeled image in the first image sample may be converted into a corresponding pixel classification matrix. For example, a matrix element corresponding to a white pixel may be set to 1, and a matrix element corresponding to a black pixel may be set to 0. The server performs weighting on losses of the black pixels and the white pixels according to the quantity of pixels through a loss function based on the model recognition result and the semantic segmentation labeled image in the first image sample, and adjusts the network weights of the first image recognition model. The foregoing loss function may be Softmax loss, L2 loss, focal loss, or the like. This is not limited herein. After the training is finished, the image recognition model used in a subsequent image processing process may be obtained.

In an embodiment, because the backbone network of the first image recognition model is pre-trained, in the training process based on the first image samples, the backbone network may adopt a learning rate smaller than that of a spatial pooling module and the dilated convolution module, to avoid that an excessively large learning rate of the backbone network reduces the accuracy of the image recognition model obtained through training. For example, the learning rate of the spatial pooling module and the dilated convolution module may be $10^{-3}$, and the learning rate of the backbone network may be $10^{-4}$.

In an embodiment, the server may train the first image recognition model based on a plurality of graphics processing units (GPU), and each graphics processing unit processes a preset quantity of image samples concurrently at the same time, thereby improving efficiency of training the image recognition model. For example, two GPUs are used for training, and each GPU processes four images concurrently.

To clearly display a cell image, the gastric pathological image has a relatively large pixel size. For example, the pixel size is n*m, and a value of n or m may reach tens of thousands or hundreds of thousands. To reduce the volume of processed data, reduce the processing time and ensure the accuracy, pre-processing may be performed before the gastric pathological image is processed. That is, the gastric pathological image may be first segmented, and a scaling operation may be further performed on the segmented image, to obtain a plurality of gastric pathological sub-images with a preset pixel size. For example, the server may segment the gastric pathological image according to a pixel size of 2048*2048, and may further reduce the segmented gastric pathological image to a pixel size of 713*713. The preset pixel size may be determined by the image recognition model established by a skilled person. This is not limited herein. Both the images and the corresponding semantic segmentation labeled images in the first image samples may be pre-processed in the same manner. For each gastric pathological sub-image, the training process of the image recognition model is similar to the foregoing process. Details are not described herein again.

After the training is finished, the foregoing image recognition model may be used in the image processing method provided in this embodiment of this application.

Figure 12:
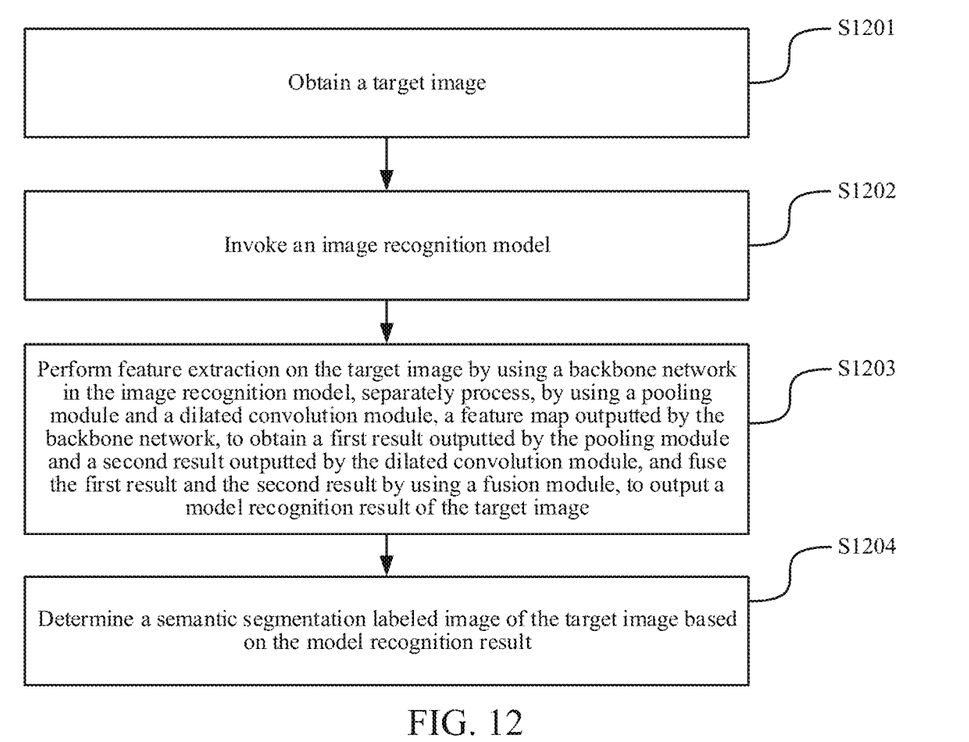
FIG. 12 is a flowchart of an image processing method according to an embodiment of this application.

Referring to the flowchart of the image processing method shown in FIG. 12, a processing procedure of the method may be as follows:

S1201. Obtain a target image.

In an embodiment, a user may transmit an image processing request to the server through a terminal, where the image processing request may carry a to-be-processed gastric pathological image (that is, the target image). Then, the server may obtain the to-be-processed target image from the image processing request.

S1202. Invoke an image recognition model.

The image recognition model may include: a backbone network, a pooling module and a dilated convolution module that are connected to the backbone network and that are parallel to each other, and a fusion module connected to the pooling module and the dilated convolution module, and the backbone network may be used for extracting a feature map of an image.

S1203. Perform feature extraction on the target image by using the backbone network in the image recognition model, separately process, by using the pooling module and the dilated convolution module, a feature map outputted by the backbone network, to obtain a first result outputted by the pooling module and a second result outputted by the dilated convolution module, and fuse the first result and the second result by using the fusion module, to output a model recognition result of the target image.

In an embodiment, the server may invoke the image recognition model obtained through training according to the model training steps described in the foregoing embodiment to process the target image. The backbone network of the image recognition model may obtain the feature map of the target image through calculation, and use the feature map of the target image as an input of the pooling module and an input of the dilated convolution module. The pooling module performs calculation on the feature map of the target image to obtain the first result. The dilated convolution module performs calculation on the feature map of the target image to obtain the second result. The results outputted by the pooling module and the dilated convolution module may be pixel classification matrices, and numerical values of elements in the matrices may represent classification results of the pixels. Then, the first result and the second result may be fused by using the fusion module, to output the obtained model recognition result of the target image. For example, for the matrix element corresponding to each pixel, a maximal numerical value in the first result and the second result may be used as a fusion result. Alternatively, the matrix elements of each position in the first result and each position in the second result may be averaged, and an obtained average value may be used as a fusion result.

In an embodiment, a skilled person may preset weights of the pooling module and the dilated convolution module. Correspondingly, fusion processing may be as follows: performing weighted average on the first result and the second result by using the fusion module based on a first weight corresponding to the pooling module and a second weight corresponding to the dilated convolution module, to output the model recognition result of the target image. In a case that a plurality of parallel modules are connected behind the backbone network, by setting weights for different modules, effects of different modules on the model recognition result may be controlled, so as to meet different index requirements (for example, the accuracy or the segmentation precision).

When fusing the first result and the second result, the server may perform the weighted average on the matrix elements in two pixel classification matrices by using the fusion module, to obtain the model recognition result of the target image. For example, the first weight may be 0.4, the second weight may be 0.6, a classification result of a pixel in the first result is 0.75, and a classification result of the pixel in the second result is 0.8. In this case, a classification result of the pixel in the model recognition result obtained through fusion is (0.4*0.75+0.6*0.8)/(0.4+0.6)=0.78.

In an embodiment, the dilated convolution module may include more than one dilated convolution branch with different dilation rates, and each dilated convolution branch may output a recognition result. Therefore, a skilled person may also preset a weight for each dilated convolution branch, and fuse each recognition result based on the weights. A fusion process may be similar to the foregoing fusion process of the first result and the second result. This is not limited herein.

S1204. Determine a semantic segmentation labeled image of the target image based on the model recognition result.

In an embodiment, the model recognition result may be a pixel classification matrix having the same pixel size as the target image, and each element on the matrix represents a classification result of a corresponding pixel. For example, a classification result value range of the pixel may be [0, 1], which represents a probability that the pixel belongs to a "cancer" or "cancer-free" class. The server may label each pixel according to the pixel classification matrix, to obtain the semantic segmentation labeled image. For example, a pixel corresponding to a matrix element greater than or equal to 0.5 is labeled with white (that is, the pixel belongs to a "cancer" class), and a pixel corresponding to a matrix element less than 0.5 is labeled with black (that is, the pixel belongs to a "cancer-free" class), to obtain a black and white binary image having the same pixel size as the target image.

In an embodiment, the server may segment the target image, and then perform the foregoing processing on each target sub-image obtained through segmentation. Correspondingly, the foregoing step S1201 may be as follows: obtaining a target image, and segmenting the target image, to obtain a plurality of target sub-images of a preset pixel size. The segmentation process has been described in the foregoing training process of the image recognition model. Details are not described herein again. In addition, the server may further record an arrangement sequence of the target sub-images obtained through segmentation in the target image.

In an embodiment, the foregoing step S1203 may specifically include the following steps: performing, for each target sub-image, feature extraction on the target sub-image by using the backbone network in the image recognition model, separately processing, by using the pooling module and the dilated convolution module, a feature map outputted by the backbone network, to obtain a first result outputted by the pooling module and a second result outputted by the dilated convolution module, and fusing the first result and the second result by using the fusion module, to output a model recognition result of the target sub-image. The process of performing image recognition processing on the target sub-image is similar to the process of the foregoing step S1203. Details are not described herein again.

In an embodiment, the foregoing step S1204 may specifically include: obtaining semantic segmentation sub-labeled images of the plurality of target sub-images based on model recognition results of the plurality of target sub-images; and splicing the semantic segmentation sub-labeled images of the plurality of target sub-images sequentially, to obtain the semantic segmentation labeled image of the target image.

The server may obtain the semantic segmentation sub-labeled image of each target sub-image through a process similar to the foregoing step S1204. Details are not described herein again. Then, the server may splice the semantic segmentation sub-labeled image of each target sub-image according to the arrangement sequence of the target sub-images in the target image, to obtain the semantic segmentation labeled image of the target image. If the target sub-images are further scaled after the target image is segmented, the server may further scale the semantic segmentation sub-labeled image of each target sub-image to an original pixel size, and then splice the semantic segmentation sub-labeled image of each target sub-image. Alternatively, the server may perform magnification after splicing, to ensure that the semantic segmentation labeled image has the same pixel size as the target image.

Finally, the server may return the semantic segmentation labeled image of the target image to the terminal, so that the user may view the semantic segmentation labeled image. The user only needs to input the to-be-processed gastric pathological image, and the semantic segmentation labeled image may be obtained. It is convenient to use, and the user may quickly learn the abnormal tissue region, for example, a cancer tissue region, on the gastric pathological image. In addition, the semantic segmentation labeled image with high accuracy and high reliability may help experienced doctors improve working efficiency, reduce workload, and may further assist inexperienced doctors in diagnosis based on the gastric pathological image, thereby improving service capability.

The image processing method provided in this embodiment of this application has a better distinguishing effect on cells, and may be applied to frontier research in the cancer pathological field such as tumor infiltrating lymphocytes (TILs). In addition, after the semantic segmentation labeled image of the image is obtained, counting processing may be further added, thereby facilitating counting statistics on cells, KI67, or the like, so as to assist doctors in diagnosis.

In this embodiment of this application, the image recognition model may include the pooling module and the dilated convolution module that are parallel to each other. The pooling module and the dilated convolution module may obtain two recognition results of the target image respectively, and the two recognition results are fused to obtain the model recognition result. Such an image recognition model may reserve advantages of both the pooling module and the dilated convolution module. Cancer tissue regions of different sizes may be recognized, while the segmentation precision may be ensured, so that when the server performs semantic segmentation on the image based on the image recognition model, requirements of both the accuracy and the segmentation precision may be met.

Figure 13:
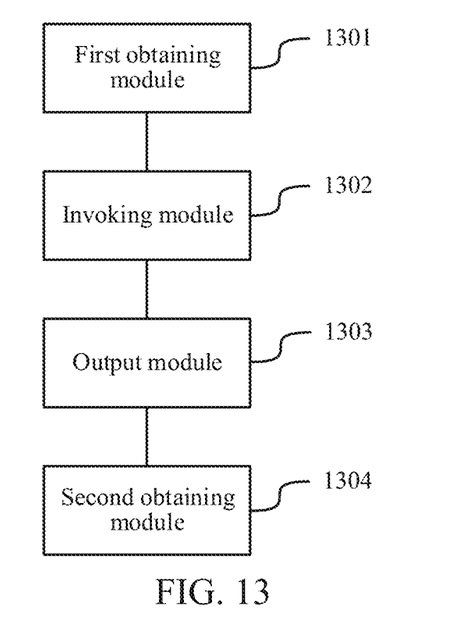
FIG. 13 is a schematic structural diagram of an image processing apparatus according to an embodiment of this application.

Based on the same technical concept, an embodiment of this application further provides an image processing apparatus. As shown in FIG. 13, the apparatus includes:

a first obtaining module 1301, configured to obtain a target image;

an invoking module 1302, configured to invoke an image recognition model, the image recognition model including: a backbone network, a pooling module and a dilated convolution module that are connected to the backbone network and that are parallel to each other, and a fusion module connected to the pooling module and the dilated convolution module, and the backbone network being used for extracting a feature map of an image;

an output module 1303, configured to: perform feature extraction on the target image by using the backbone network in the image recognition model, separately process, by using the pooling module and the dilated convolution module, the feature map outputted by the backbone network, to obtain a first result outputted by the pooling module and a second result outputted by the dilated convolution module, and fuse the first result and the second result by using the fusion module, to output a model recognition result of the target image; and a second obtaining module 1304, configured to determine a semantic segmentation labeled image of the target image based on the model recognition result.

In an embodiment, the output module 1303 is further configured to perform weighted average calculation on the first result and the second result based on a first weight corresponding to the pooling module and a second weight corresponding to the dilated convolution module, to output the model recognition result of the target image.

In an embodiment, the dilated convolution module includes more than one dilated convolution branch with different dilation rates.

In an embodiment, the first obtaining module 1301 is further configured to segment the target image, to obtain a plurality of target sub-images of a preset pixel size. The output module 1303 is further configured to: perform, for each target sub-image, feature extraction on the target sub-image by using the backbone network in the image recognition model, separately process, by using the pooling module and the dilated convolution module, a feature map outputted by the backbone network, to obtain a first result outputted by the pooling module and a second result outputted by the dilated convolution module, and fuse the first result and the second result by using the fusion module, to output a model recognition result of the target sub-image.

In an embodiment, the second obtaining module 1304 is further configured to: determine semantic segmentation sub-labeled images of the plurality of target sub-images based on model recognition results of the plurality of target sub-images; and splice the semantic segmentation sub-labeled images of the plurality of target sub-images sequentially, to obtain the semantic segmentation labeled image of the target image.

In an embodiment, the apparatus further includes: a third obtaining module 1305, a fourth obtaining module 1306, and a first training module 1307.

The third obtaining module 1305 is configured to obtain a plurality of first image samples, the first image samples including images belonging to the same type as the target image and corresponding semantic segmentation labeled images.

The fourth obtaining module 1306 is configured to obtain a first image recognition model, the first image recognition model including: a pre-trained backbone network, an initial pooling module and an initial dilated convolution module that are connected to the pre-trained backbone network and that are parallel to each other, and an initial fusion module connected to the initial pooling module and the initial dilated convolution module.

The first training module 1307 is configured to train the first image recognition model based on the plurality of first image samples, to obtain the image recognition model.

In an embodiment, the apparatus further includes: a fifth obtaining module 1308, a sixth obtaining module 1309, a second training module 1310, and a deletion module 1311.

The fifth obtaining module 1308 is configured to obtain a plurality of second image samples, the second image samples including a plurality of types of images and corresponding classification results.

The sixth obtaining module 1309 is configured to obtain a second image recognition model, the second image recognition model including an initial backbone network and a classification module.

The second training module 1310 is configured to train the second image recognition model based on the plurality of second image samples, to obtain a trained second image recognition model.

The deletion module 1311 is configured to delete a classification module of the trained second image recognition model, to obtain the pre-trained backbone network.

In an embodiment, the first training module 1307 is further configured to train the first image recognition model based on a plurality of graphics processing units, each graphics processing unit processing a preset quantity of image samples concurrently at the same time.

In an embodiment, the target image is a pathological image, and the semantic labeled image is used for labeling an abnormal tissue region.

Specific manners of performing operations by the modules of the apparatus in the foregoing embodiment have been described in detail in the embodiment related to the method, and are not described in detail herein.

In this embodiment of this application, the image recognition model may include the pooling module and the dilated convolution module that are parallel to each other. The pooling module and the dilated convolution module may obtain two recognition results of the target image respectively, and the two recognition results are fused to obtain a model recognition result. Such an image recognition model may reserve advantages of both the pooling module and the dilated convolution module. Cancer tissue regions of different sizes may be recognized, while the segmentation precision may be ensured, so that when the server performs semantic segmentation on the image based on the image recognition model, requirements of both the accuracy and the segmentation precision may be met.

When the image processing apparatus provided in the foregoing embodiment processes the target image, the division of the foregoing functional modules is merely used as an example for description. In actual application, the foregoing functions may be allocated to and completed by different functional modules according to requirements, that is, an internal structure of the server is divided into different functional modules, to complete all or some of the functions described above. In addition, the image processing apparatus provided in the foregoing embodiment belongs to the same idea as the image processing method. For a specific implementation process, refer to the method embodiment. Details are not described herein again.

Figure 14:
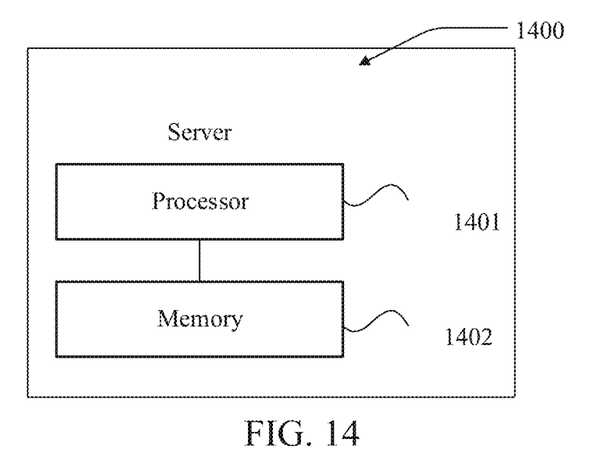
FIG. 14 is a schematic structural diagram of a computer device according to an embodiment of this application.

FIG. 14 is a schematic structural diagram of a computer device according to an embodiment of this application. The computer device may be specifically the server 102 in FIG. 1. The computer device 1400 may vary greatly due to different configurations or different performance, and may include one or more central processing units (CPUs) 1401 and one or more memories 1402.

In an embodiment, computer-readable instructions are stored in the memory 1402, the computer-readable instructions, when executed by the processor 1401, causing the processor to perform the following steps: obtaining a target image; invoking an image recognition model, the image recognition model including: a backbone network, a pooling module and a dilated convolution module that are connected to the backbone network and that are parallel to each other, and a fusion module connected to the pooling module and the dilated convolution module, the backbone network being used for extracting a feature map of an image; performing feature extraction on the target image by using the backbone network in the image recognition model, separately processing, by using the pooling module and the dilated convolution module, a feature map outputted by the backbone network, to obtain a first result outputted by the pooling module and a second result outputted by the dilated convolution module, and fusing the first result and the second result by using the fusion module, to output a model recognition result of the target image; and determining a semantic segmentation labeled image of the target image based on the model recognition result.

In an embodiment, the computer-readable instructions, when executed by the processor, cause the processor to perform the following steps: performing weighted average calculation on the first result and the second result by using the fusion module based on a first weight corresponding to the pooling module and a second weight corresponding to the dilated convolution module, to output the model recognition result of the target image.

In an embodiment, the dilated convolution module includes more than one dilated convolution branch with different dilation rates.

In an embodiment, the computer-readable instructions, when executed by the processor, cause the processor to perform the following steps: segmenting the target image, to obtain a plurality of target sub-images of a preset pixel size; and performing, for each target sub-image, feature extraction on the target sub-image by using the backbone network in the image recognition model, separately processing, by using the pooling module and the dilated convolution module, a feature map outputted by the backbone network, to obtain a first result outputted by the pooling module and a second result outputted by the dilated convolution module, and fusing the first result and the second result by using the fusion module, to output a model recognition result of the target sub-image.

In an embodiment, the computer-readable instructions, when executed by the processor, cause the processor to perform the following steps: determining semantic segmentation sub-labeled images of the plurality of target sub-images based on model recognition results of the plurality of target sub-images; and splicing the semantic segmentation sub-labeled images of the plurality of target sub-images sequentially, to obtain the semantic segmentation labeled image of the target image.

In an embodiment, the computer-readable instructions, when executed by the processor, cause the processor to perform the following steps: obtaining a plurality of first image samples, the first image samples including images belonging to the same type as the target image and corresponding semantic segmentation labeled images; obtaining a first image recognition model, the first image recognition model including: a pre-trained backbone network, an initial pooling module and an initial dilated convolution module that are connected to the pre-trained backbone network and that are parallel to each other, and an initial fusion module connected to the initial pooling module and the initial dilated convolution module; and training the first image recognition model based on the plurality of first image samples, to obtain the image recognition model.

In an embodiment, the computer-readable instructions, when executed by the processor, cause the processor to perform the following steps: obtaining a plurality of second image samples, the second image samples including various types of images and corresponding classification results; obtaining a second image recognition model, the second image recognition model including an initial backbone network and a classification module; training the second image recognition model based on the plurality of second image samples, to obtain a trained second image recognition model; and deleting a classification module of the trained second image recognition model, to obtain the pre-trained backbone network.

In an embodiment, the computer-readable instructions, when executed by the processor, cause the processor to perform the following step: training the first image recognition model based on a plurality of graphics processing units, each graphics processing unit processing a preset quantity of image samples concurrently at the same time.

In an embodiment, the target image is a pathological image, and the semantic labeled image is used for labeling an abnormal tissue region.

In this embodiment of this application, the image recognition model may include the pooling module and the dilated convolution module that are parallel to each other. The pooling module and the dilated convolution module may obtain two recognition results of the target image respectively, and the two recognition results are fused to obtain a model recognition result. Such an image recognition model may reserve advantages of both the pooling module and the dilated convolution module. Cancer tissue regions of different sizes may be recognized, while the segmentation precision may be ensured, so that when the server performs semantic segmentation on the image based on the image recognition model, requirements of both the accuracy and the segmentation precision may be met.

In an embodiment, a computer readable storage medium is provided, storing a computer program, the computer program, when executed by a processor, causing the processor to perform the steps of the foregoing image processing method. The steps of the image processing method herein may be the steps of the image processing method in the foregoing embodiments.

A person of ordinary skill in the art may understand that all or some of the steps of the embodiments may be implemented by hardware or a program instructing related hardware. The program may be stored in a computer-readable storage medium. The above-mentioned storage medium may be a read-only memory, a magnetic disk, an optical disc, or the like.

The foregoing descriptions are merely possible embodiments of this application, but are not intended to limit this application. Any modification, equivalent replacement, or improvement made within the spirit and principle of this application shall fall within the protection scope of this application.

What is claimed is:

1. An information processing method, performed by a computer device having a processor and a memory, the memory storing a plurality of computer-readable instructions to be executed by the processor, the method comprising:

obtaining a target image;

performing feature extraction on the target image by using an image recognition model to generate a model recognition result of the target image, wherein:
the image recognition model comprises: a backbone network, a pooling module and a dilated convolution module that are connected to the backbone network and that are parallel to each other, and a fusion module connected to the pooling module and the dilated convolution module; and
performing the feature extraction on the target image comprises:
extracting, using the backbone network, a feature map of the target image;
separately processing, using the pooling module and the dilated convolution module, the feature map generated by the backbone network, to obtain a first result outputted by the pooling module and a second result outputted by the dilated convolution module; and
fusing, using the fusion module, the first result and the second result into the model recognition result of the target image; and
determining a semantic segmentation labeled image of the target image based on the model recognition result.

2. The method according to claim 1, wherein fusing the first result and the second result into the model recognition result of the target image comprises:
performing weighted average calculation on the first result and the second result by using the fusion module based on a first weight corresponding to the pooling module and a second weight corresponding to the dilated convolution module, to output the model recognition result of the target image.

3. The method according to claim 1, wherein the dilated convolution module comprises more than one dilated convolution branch with different dilation rates.

4. The method according to claim 1, wherein performing the feature extraction on the target image by using an image recognition model to generate a model recognition result of the target image further comprises:
segmenting the target image into a plurality of target sub-images of a preset pixel size;
for each target sub-image,
extracting, using the backbone network, a feature map;
separately processing, using the pooling module and the dilated convolution module, the feature map to obtain a first result outputted by the pooling module and a second result outputted by the dilated convolution module; and
fusing, using the fusion module, the first result and the second result into a model recognition result of the target sub-image.

5. The method according to claim 4, wherein determining the semantic segmentation labeled image of the target image based on the model recognition result comprises:
determining semantic segmentation sub-labeled images of the plurality of target sub-images based on model recognition results of the plurality of target sub-images; and
splicing the semantic segmentation sub-labeled images of the plurality of target sub-images sequentially, to obtain the semantic segmentation labeled image of the target image.

6. The method according to claim 1, wherein a training operation of the image recognition model comprises:
obtaining a plurality of first image samples, the first image samples comprising images belonging to the same type as the target image and corresponding semantic segmentation labeled images;
obtaining a first image recognition model, the first image recognition model comprising: a pre-trained backbone network, an initial pooling module and an initial dilated convolution module that are connected to the pre-trained backbone network and that are parallel to each other, and an initial fusion module connected to the initial pooling module and the initial dilated convolution module; and
training the first image recognition model based on the plurality of first image samples, to obtain the image recognition model.

7. The method according to claim 6, wherein a pre-training operation of the backbone network comprises:
obtaining a plurality of second image samples, the second image samples comprising a plurality of types of images and corresponding classification results;
obtaining a second image recognition model, the second image recognition model comprising an initial backbone network and a classification module;
training the second image recognition model based on the plurality of second image samples, to obtain a trained second image recognition model; and
deleting a classification module of the trained second image recognition model, to obtain the pre-trained backbone network.

8. The method according to claim 6, wherein the training operation of the image recognition model further comprises:
training the first image recognition model based on a plurality of graphics processing units, each graphics processing unit processing a preset quantity of image samples concurrently at the same time.

9. The method according to claim 1, wherein the target image is a pathological image, and the semantic labeled image is used for labeling an abnormal tissue region.

10. A computer device, the computer device comprising a processor and a memory, the memory storing a plurality of computer-readable instructions, the computer-readable instructions, when executed by the processor, cause the processor to perform a plurality of operations including:
obtaining a target image;
performing feature extraction on the target image by using an image recognition model to generate a model recognition result of the target image, wherein:
the image recognition model comprises: a backbone network, a pooling module and a dilated convolution module that are connected to the backbone network and that are parallel to each other, and a fusion module connected to the pooling module and the dilated convolution module; and
performing the feature extraction on the target image comprises:
extracting, using the backbone network, a feature map of the target image;
separately processing, using the pooling module and the dilated convolution module, the feature map generated by the backbone network, to obtain a first result outputted by the pooling module and a second result outputted by the dilated convolution module; and
fusing, using the fusion module, the first result and the second result into the model recognition result of the target image; and determining a semantic segmentation labeled image of the target image based on the model recognition result.

11. The computer device according to claim 10, wherein the fusing the first result and the second result into the model recognition result of the target image comprises:

performing weighted average calculation on the first result and the second result by using the fusion module based on a first weight corresponding to the pooling module and a second weight corresponding to the dilated convolution module, to output the model recognition result of the target image.

12. The computer device according to claim 10, wherein the dilated convolution module comprises more than one dilated convolution branch with different dilation rates.

13. The computer device according to claim 10, wherein a training operation of the image recognition model comprises:

obtaining a plurality of first image samples, the first image samples comprising images belonging to the same type as the target image and corresponding semantic segmentation labeled images;

obtaining a first image recognition model, the first image recognition model comprising: a pre-trained backbone network, an initial pooling module and an initial dilated convolution module that are connected to the pre-trained backbone network and that are parallel to each other, and an initial fusion module connected to the initial pooling module and the initial dilated convolution module; and training the first image recognition model based on the plurality of first image samples, to obtain the image recognition model.

14. The computer device according to claim 13, wherein a pre-training operation of the backbone network comprises:

obtaining a plurality of second image samples, the second image samples comprising a plurality of types of images and corresponding classification results;

obtaining a second image recognition model, the second image recognition model comprising an initial backbone network and a classification module;

training the second image recognition model based on the plurality of second image samples, to obtain a trained second image recognition model; and deleting a classification module of the trained second image recognition model, to obtain the pre-trained backbone network.

15. The computer device according to claim 13, wherein the training operation of the image recognition model further comprises:

training the first image recognition model based on a plurality of graphics processing units, each graphics processing unit processing a preset quantity of image samples concurrently at the same time.

16. The computer device according to claim 10, wherein the target image is a pathological image, and the semantic labeled image is used for labeling an abnormal tissue region.

17. A non-transitory computer-readable storage medium, storing a plurality of computer readable instructions, the computer readable instructions, when executed by one or more processors of a computer device, causing the computer device to perform a plurality of operations including:

obtaining a target image;

performing feature extraction on the target image by using an image recognition model to generate a model recognition result of the target image, wherein:

the image recognition model comprises: a backbone network, a pooling module and a dilated convolution module that are connected to the backbone network and that are parallel to each other, and a fusion module connected to the pooling module and the dilated convolution module; and performing the feature extraction on the target image comprises:

extracting, using the backbone network, a feature map of the target image;

separately processing, using the pooling module and the dilated convolution module, the feature map generated by the backbone network, to obtain a first result outputted by the pooling module and a second result outputted by the dilated convolution module; and fusing, using the fusion module, the first result and the second result into the model recognition result of the target image; and determining a semantic segmentation labeled image of the target image based on the model recognition result.

* * * * *